UNITED STATES PATENT OFFICE 2,071,313

PROCESS FOR PREPARING A SYNTHETIC RESIN COMPOSITION

Sydney Leonard Morgan Saunders, London, England

No Drawing. Application March 2, 1935, Serial No. 9,105. In Great Britain December 21, 1933

3 Claims. (Cl. 260—8)

This invention relates to alkyd resins.

The object of the invention is to provide an improved process for the manufacture of synthetic resin compositions containing non-drying or drying oils and/or naturally occurring resins.

It is a known fact that a polyhydric alcohol will react with a polybasic organic anhydride to produce a material which possesses the characteristics of a resin. Such resins have, however, limited application owing to their limited solubility in solvents, and their limited compatibility with film forming materials such as vegetable oils or nitrocellulose. It has, therefore, been found necessary to modify these resins in order to improve their solubility and compatibility by replacing a portion of the polybasic organic anhydride with a monobasic acid such as for example, that derived from a drying oil.

It has been proposed to react the polybasic organic anhydride with the polyhydric alcohol, and before the reaction is complete, to introduce a quantity of fatty acid, such as that derived from linseed oil. Now owing to the nature of the acid, it is not miscible with the partially condensed reaction mixture, and consequently it separates, and it is only by prolonged heating with vigorous stirring that complete admixture is obtained.

It has now been discovered that the partially condensed reaction mixture is soluble within wide limits in a partial ester of a polyhydric alcohol and a monobasic acid.

According to the present invention, a process for preparing a modified alkyd resin comprises the addition of a partially esterified polyhydric alcohol containing at least two free hydroxyl groups, the acid constituent being a monobasic acid such as benzoic, or acetic acids, or the acids derived from vegetable oils, or from naturally occurring resins, to the product obtained from the incomplete condensation of a polybasic organic anhydride and a polyhydric alcohol and continuing the condensation reaction.

The invention also includes a process according to the preceding paragraph, wherein an excess of the polybasic organic anhydride sufficient to combine with the partial ester, is added to the initial condensation product at any stage, or to the partial ester prior to addition to the condensate or to their admixture.

The invention also includes a process wherein condensation is carried out in the presence of vegetable oils which may be heat-treated and/or naturally occurring resins or esterified resins. Alternatively the partial ester may be heat-treated prior to its addition to the condensation product.

The invention further includes lacquers, (for example, those made from nitro-cellulose, cellulose acetate) comprising synthetic resin compositions produced by the process described herein.

The following examples illustrate the nature of this invention, but do not restrict it. The parts are by weight:—

Example 1

20 parts of phthalic anhydride and 7 parts of glycerine are heated together for 30 minutes at 160°–170° C. and then 15 parts of the monoglycerol ester of linoleic acid is added, and the mixture heated to 250°–260° C. for 1½ hours. The product may be thinned with hydrocarbon, and the necessary driers added.

Example 2

60 parts of phthalic anhydride and 40 parts of glycerine are heated together for 20 minutes at 160°–170° C., and then 148 parts of the monoglyceride of linoleic acid together with a further 60 parts of phthalic anhydride are added, and the condensation continued for 2 hours at 250°–260° C.

I claim:-

1. A process for preparing a synthetic resin composition which consists in heating glycerol and phthalic anhydride together until partial reaction occurs, then adding a mono-glyceride of a drying oil acid and continuing the heating at a sufficient temperature to complete the condensation reaction.

2. A process for preparing a synthetic resin composition which consists in heating glycerol and phthalic anhydride together at 160° C.–170° C. for 30 minutes, then adding the mono-glycerol ester of linoleic acid and further heating the mixture at 250° C.–260° C. for 1½ hours.

3. A process for preparing a synthetic resin composition which consists in heating glycerol and phthalic anhydride together at 160° C.–170° C. for 20 minutes, then adding the monoglycerol ester of linoleic acid together with further phthalic anhydride and further heating the mixture at 250° C.–260° C. for 2 hours.

SYDNEY LEONARD MORGAN SAUNDERS.